United States Patent
Pham et al.

(10) Patent No.: US 11,153,099 B2
(45) Date of Patent: Oct. 19, 2021

(54) REESTABLISHING SECURE COMMUNICATION WITH A SERVER AFTER THE SERVER'S CERTIFICATE IS RENEWED WITH A CERTIFICATE AUTHORITY UNKNOWN TO THE CLIENT

(71) Applicant: Dell Products L.P., Round Rock, TX (US)

(72) Inventors: Ngoc Pham, San Jose, CA (US); Satya Mylvara, Sunnyvale, CA (US)

(73) Assignee: Dell Products L.P., Round Rock, TX (US)

( * ) Notice: Subject to any disclaimer, the term of this patent is extended or adjusted under 35 U.S.C. 154(b) by 294 days.

(21) Appl. No.: 16/539,372

(22) Filed: Aug. 13, 2019

(65) Prior Publication Data
US 2021/0051029 A1    Feb. 18, 2021

(51) Int. Cl.
*H04L 9/32*    (2006.01)
*G06F 21/57*    (2013.01)

(52) U.S. Cl.
CPC .......... *H04L 9/3268* (2013.01); *G06F 21/575* (2013.01); *H04L 9/3213* (2013.01); *G06F 2221/032* (2013.01)

(58) Field of Classification Search
CPC .................................................. H04L 9/3268
See application file for complete search history.

(56) References Cited

U.S. PATENT DOCUMENTS

| 2002/0103909 A1* | 8/2002 | Devine ................... H04L 67/14 709/227 |
| 2007/0136795 A1* | 6/2007 | Youn ................... H04L 63/0846 726/5 |
| 2008/0162703 A1* | 7/2008 | Stevens ................... H04L 29/06 709/227 |
| 2012/0054491 A1* | 3/2012 | Tippett ................... H04L 9/3213 713/168 |

* cited by examiner

*Primary Examiner* — Bradley W Holder
(74) *Attorney, Agent, or Firm* — Kirton McConkie; Brian Tucker

(57) ABSTRACT

Secure communication with a server can be reestablished after the server's certificate is renewed with a certificate authority unknown to a client. When a server's certificate is renewed with a CA whose certificate does not exist in a client's certificate store, the client will not be able to authenticate the server using SSL unless the CA's certificate is added to the certificate store. When a client is not updated to include the CA's certificate and therefore fails to authenticate the server, a web-based application on the client can perform a fallback authentication process to securely and automatically add any necessary CA certificates to the certificate store thereby eliminating the need for an administrator to manually install the necessary CA certificates.

20 Claims, 12 Drawing Sheets

REESTABLISHING SECURE COMMUNICATION WITH A SERVER AFTER THE SERVER'S CERTIFICATE IS RENEWED WITH A CERTIFICATE AUTHORITY UNKNOWN TO THE CLIENT

CROSS-REFERENCE TO RELATED APPLICATIONS

N/A

BACKGROUND

HTTPS has become the de facto standard for secure client/server communications. With HTTPS, the server can certify its identity to the client and support encrypted communications among other things. Such security features are currently implemented using the Secure Socket Layer (SSL) or Transport Layer Security (TLS) protocol and X.509 certificates.

FIG. 1 illustrates a simple client/server environment 100 to represent how SSL is implemented when a client 110 attempts to communicate with a server 120 using HTTPS. Although client 110 could employ any web-based application to communicate with server 120, to provide a familiar example, it will be assumed that a user of client 110 employs a browser 112 to navigate to a web site that server 120 hosts. For example, assuming server 120 hosts the website www.dell.com, the user may type in www.dell.com into browser 112, and in response, browser 112 will implement the HTTPS protocol as part of a request to server 120 to retrieve the webpage that www.dell.com represents. Although not shown, the HTTPS request that browser 112 sends may specify a list of SSL versions and cipher suites that client 110 supports.

In response to the HTTPS request, server 120 sends its certificate and may also identify a particular SSL version and cipher suite to use for the client/server session. Upon receiving the server's certificate, browser 112 will attempt to verify it before communicating further with server 120 (e.g., before retrieving the actual webpage). This verification of the server's certificate enables browser 112 to verify that server 120 is in fact Dell's server. In other words, in SSL, the server uses its certificate to authenticate to the client.

A certificate includes a number of fields that are used during the verification process. These fields include an issuer field which identifies the certificate authority (CA) that issued the certificate, the common name field which identifies the domain name of the server to which the certificate was issued, valid to and valid from fields which define the certificate's period of validity, a public key field which includes the server's public key and possibly many other fields. The issuing CA uses its private key to sign any certificate that it issues.

To enable client 110 to verify a certificate, it includes a certificate store 111 within which are stored the certificates of any trusted CA. For example, in the Windows operating system, certificate store 111 may include a trusted root CAs folder and a trusted intermediate CAs folder which store the certificates of any trusted CAs. The operating system may oftentimes come with preinstalled certificates for trusted CAs, but certificates may also be added such as via an automatic or manual update.

As mentioned above, a legitimate certificate will be issued by a particular CA and signed using that CA's private key. Therefore, browser 112 can access the issuer field of the server's certificate to identify the issuing CA and then determine whether that CA's certificate is stored in certificate store 111. If the issuing CA's certificate is stored in certificate store 111, browser 112 can employ the public key in the CA's certificate to verify the signature on the certificate it received from server 120. If the signature is verified, browser 112 can then verify that the common name identified in server 120's certificate matches server 120's domain name. Using the example from above, server 120's certificate's common name field may identify *.dell.com (where * is a wildcard), and browser 112 may verify that server 120's domain name (www.dell.com) matches. Since a malicious user could not modify the common name field without invalidating the signature (and would not have access to the CA's private key to generate a valid signature across the modified data), the combined steps of verifying the signature and verifying the common name (among possibly other steps) authenticate server 120.

Additionally, virtually all certificates are based on a "chain of trust" consisting of a root CA's certificate, one or more intermediate CA's certificates, and then the server's certificate. The same verification steps are performed at each branch in the chain of trust to ensure that the server's certificate can be traced back to a trusted root CA. For example, the certificate for www.dell.com is issued by the intermediate CA, DigiCert SHA2 Secure Server CA, whose certificate is issued by the root CA, DigiCert Global Root CA. Therefore, for browser 112 to verify the server's certificate, it will be necessary for certificate store 111 to include the certificates for both the intermediate CA (DigiCert SHA2 Secure Server CA) and the root CA (DigiCert Global Root CA).

If browser 112 successfully verifies server 120's certificate, and as part of SSL, it uses the public key defined in server 120's certificate to encrypt a pre-master key that will be used for the client/server session and sends the encrypted pre-master key to server 120. Server 120 will then use its private key to decrypt the pre-master key. Browser 112 and server 120 then compute a shared secret using the pre-master key and use the shared secret to encrypt subsequent communications.

On the other hand, if any certificate in server 120's certificate's chain of trust is not present in certificate store 111 or if any of these certificates are invalid (e.g., expired, revoked, etc.), browser 112 will not complete the verification of server 120's certificate. This failure of the verification of server 120's certificate may expose an actual security threat (e.g., when the failure is due to a malicious modification to server 120's certificate). However, this failure may oftentimes occur simply because server 120's certificate has been issued by a CA whose certificate has not yet been stored in certificate store 111. For example, server 120 may typically renew its certificate annually and may obtain a renewed certificate from a new intermediate CA whose certificate was not added to certificate store 111 as part of imaging client 110. Similarly, even if server 120 obtains a renewed certificate from the same intermediate CA, the intermediate CA may have been acquired and may have commenced using the acquiring company's certificates to issue certificates to servers.

Regardless of the reason, if certificate store 111 does not include each certificate necessary to verify the chain of trust for server 120's certificate, any missing certificate will need to be added to certificate store 111 to enable client 110 to authenticate and communicate securely with server 120. Typically, an administrative update (whether automatic or manual) will need to be applied on client 110 to add the necessary certificates.

In the case of browser 112, the inability to communicate securely with server 120 may not be overly problematic. For example, if server 120 is in fact legitimate but its current certificate has been issued by a CA whose certificate is not yet stored in certificate store 111, the user may be allowed to ignore the warning and continue communicating with server 120. In contrast, many web-based applications, including browsers when certain security settings are defined, are specifically configured to block any communication with an untrusted server and do not provide a way for a non-administrative user to bypass such security features. In such cases, the failure to verify server 120's certificate may render the client unusable for its intended purpose. For example, client 110 may be a thin client or other managed device that relies on a management solution that server 120 provides to perform correctly (e.g., to retrieve VDI connection information, security policies, etc.).

To prevent scenarios where the renewal of server 120's certificate may render client 110 essentially inoperable, an administrator may push any new CA certificates to client 110 (and typically many other similar clients) prior to the expiration of server 120's current certificate. These types of updates may be sufficient in theory, but in practice, there will always be a number of clients that will fail to receive the update and will therefore not store the new CA certificate(s) when they are needed to verify server 120. For example, when the update is pushed, some clients may not be powered on, others may be disconnected from the network, others may be in storage, others may have health issues, etc. Regardless of the reason, if any client fails to install the new CA certificate(s) in its certificate store, any web-based application on the client that relies on server 120 will not function correctly (or at all) until the update is applied.

A cloud-based device management suite is one example where updating certificates has proven very burdensome. In a common scenario, a company that has many thousands of employees may utilize a cloud-based device management suite to manage the employees' devices. In such a case, the device management suite may be hosted on server 120, client 110 can represent each of the thousands of employees' devices and browser 112 can be replaced with a device agent or other component that communicates with the device management suite. In this scenario, it can be seen that the failure to timely install any needed CA certificate(s) on even 5% of the employees' devices would lead to many employee complaints as their devices become unusable once the device agent fails to verify the device management suite's renewed certificate(s). The resulting administrator burden could also negatively impact the company's view and future utilization of the cloud-based device management suite.

BRIEF SUMMARY

The present invention extends to methods, systems, and computer program products for reestablishing secure communication with a server after the server's certificate is renewed with a certificate authority unknown to the client. When a server's certificate is renewed with a CA whose certificate does not exist in a client's certificate store, the client will not be able to authenticate the server using SSL unless the CA's certificate is added to the certificate store. When a client is not updated to include the CA's certificate and therefore fails to authenticate the server, a web-based application on the client can perform a fallback authentication process to securely and automatically add any necessary CA certificates to the certificate store thereby eliminating the need for an administrator to manually install the necessary CA certificates.

To enable this fallback authentication process, prior to a failed attempt to authenticate a server, the server can generate and provide a server token to a web-based application that executes on the client. Then, when the web-based application subsequently fails to authenticate the server, the web-based application can request a server token from the server that failed authentication and compare it to the previously received server token. If the server tokens match, and other conditions are met, the web-based application will have authenticated the server and can then install any CA certificates that are necessary to authenticate the server.

In one embodiment, the present invention is implemented on a client as a method for reestablishing secure communication with a server after verification of the server's certificate failed due to the client not having one or more CA certificates that are necessary to verify the server's certificate. A first server token that was received from a server can be stored on a client. Then, a current server certificate can be received from the server and an attempt to verify the current server certificate can be made. In response to failing to verify the current server certificate, a fallback authentication request can be sent to the server. In response to sending the fallback authentication request, a second server token can be received from the server. Fallback authentication can then be performed to authenticate the server. The fallback authentication includes comparing the second server token to the first server token to determine that the second server token matches the first server token. In response to authenticating the server via the fallback authentication, one or more CA certificates are added to a certificate store on the client.

In another embodiment, the present invention is implemented as computer storage media storing computer executable instructions which when executed on a client implement a web-based application that is configured to perform a method for reestablishing secure communication with a server after verification of the server's certificate failed due to the client not having one or more CA certificates that are necessary to verify the server's certificate. This method includes: establishing secure communication with a server using a first server certificate; while secure communication is established with the server using the first server certificate, receiving a first server token from the server and storing the first server token on the client; failing to establish secure communication with the server using a second server certificate; in response to the failure, sending, to the server, a fallback authentication request; in response to sending the fallback authentication request, receiving, from the server, a second server token; performing fallback authentication to authenticate the server, the fallback authentication including comparing the second server token to the first server token to determine that the second server token matches the first server token; and in response to authenticating the server via the fallback authentication, adding one or more CA certificates to a certificate store on the client.

In another embodiment, the present invention is implemented by a web-based application on a client as a method for enabling secure communication with a server to be reestablished after verification of the server's certificate failed due to the client not having one or more CA certificates that are necessary to verify the server's certificate. The web-based application can maintain, on the client, a first server token that was received from a server. The web-based application can then receive, from the server, a current server certificate and attempt to verify it. In response to failing to verify the current server certificate, the web-based application can send, to the server, a fallback authentication request. In response to sending the fallback authentication request, the web-based application receives, from the server, a second server token and one or more CA certificates. The web-based application then performs fallback authentication to authenticate the server. The fallback authentication includes: determining that a second token identifier contained in the second server token matches a first token identifier contained in the first server token; and determining that the first server token is associated with a domain name that matches a domain name specified in the current server certificate. In response to authenticating the server via the fallback authentication, the web-based application adds the one or more CA certificates to a certificate store on the client.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

In this specification and the claims, the term "client" should be construed as any computing device that is capable of communicating with a server. A client would therefore include desktops, laptops, tablets, thin clients, smart phones, etc. The present invention will be described in an environment where the server implements, or provides access to, a cloud-based device management suite, and therefore the client may be viewed as a managed device that includes an agent that employs SSL to communicate securely with the device management suite. However, the present invention could equally be implemented in other environments where the client includes any web-based application that employs SSL to communicate securely with a server. Accordingly, the term "web-based application" should be construed as any application, process or other software component that executes on a client and that implements SSL to communicate securely with a server. The term "server" should be construed as encompassing any process, whether executed on a physical or virtual machine, that implements SSL to authenticate to and communicate securely with a client.

The term "Secure Socket Layer" (or "SSL") will be used to represent the Secure Socket Layer protocol, the Transport Layer Security (or TLS) protocol (which is an enhanced version of the SSL protocol) or any other subsequent protocol that may enhance or replace the SSL or TLS protocols. The term "certificate" should be construed as encompassing any certificate that a certificate authority (or CA) issues to a server and which the server uses when implementing SSL (as that term is defined herein) to authenticate to a client.

Figure 1:
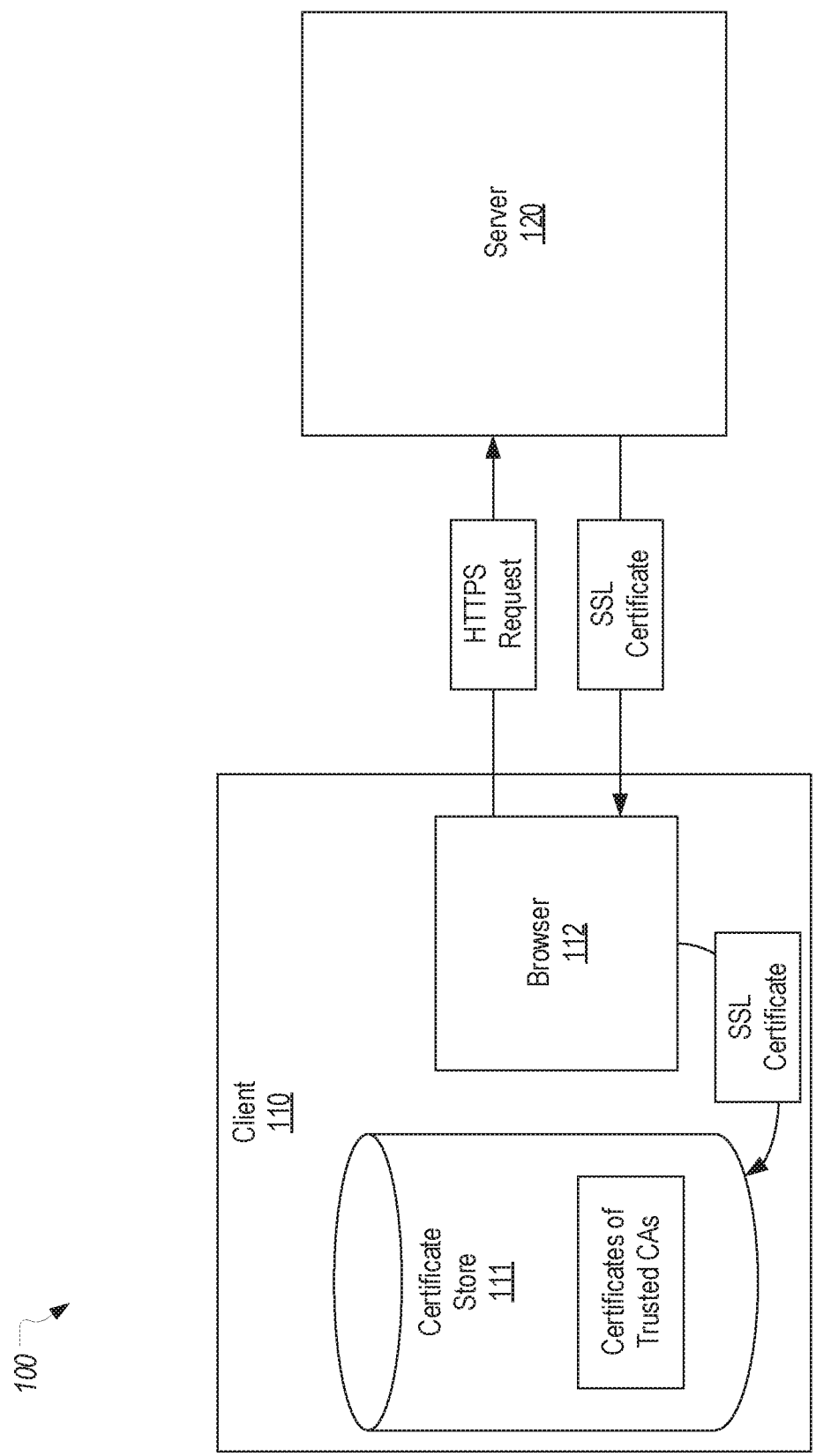
FIG. 1 illustrates how a server is authenticated using SSL.
Figure 2:
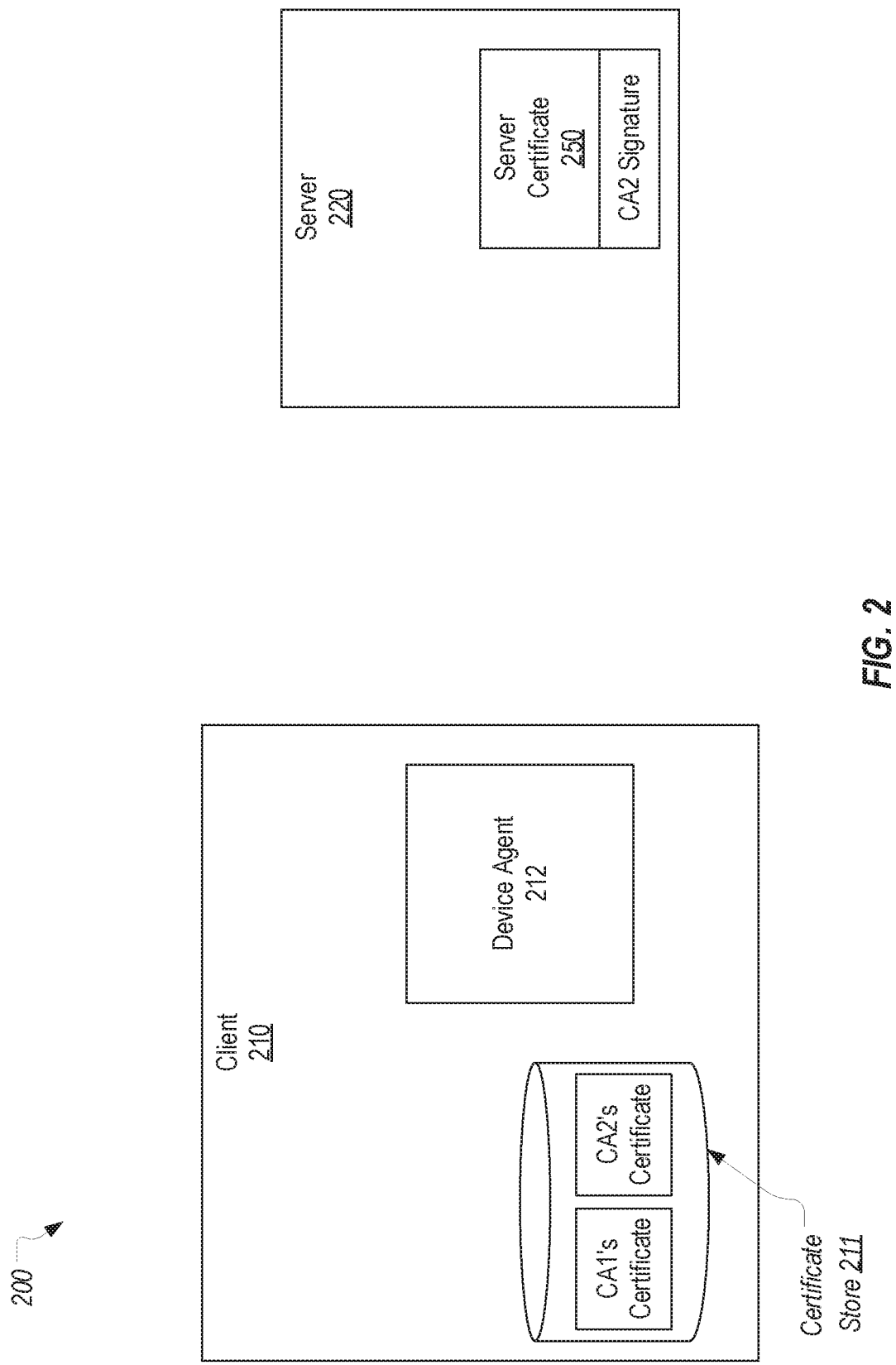
FIG. 2 illustrates an example client/server environment in which the present invention can be implemented.

FIG. 2 illustrates a client/server environment 200 which includes a client 210 and a server 220. As introduced in the background, in exemplary but non-limiting embodiments, client 210 may represent a large number of clients and server 220 may represent a cloud-based device management suite that manages each of the large number of clients. Accordingly, client 210 is shown as including device agent 212 which is a web-based application that requires secure communication with server 220 to execute properly. In other embodiments, however, device agent 212 could be replaced with any other web-based application that securely communicates with server 220 for any purpose.

In FIG. 2, it is assumed that client 210 includes a certificate store 211 that currently stores two certificates, "CA1's certificate" which is assumed to be the certificate of a root CA named CA1 and "CA2's certificate" which is assumed to be the certificate of an intermediate CA named CA2. It is also assumed that server 220 is initially issued a server certificate 250 by CA2 and therefore server certificate 250 will be signed using CA2's private key. It is further assumed that CA2's certificate is issued by CA1. As an example, a company, knowing that server 220 will obtain its certificate from CA2, may create a standard image that includes these two certificates in the certificate store and may then deploy this standard image on many clients 210 that its employees will use.

As described in the background, when device agent 212 desires to communicate with server 220, it will implement SSL techniques to retrieve server certificate 250 and verify it against the appropriate certificates in certificate store 211. Since server certificate 250 was issued and signed by CA2 while CA2's certificate was issued and signed by CA1 and because certificate store 211 stores both CA1's certificate and CA2's certificate, device agent 212 will verify server certificate 250 (assuming all other required fields are valid/correct).

As introduced in the background, server 220 will typically renew server certificate 250 annually. As long as the renewed server certificate is issued and signed by CA2, device agent 212 will continue to verify the renewed server certificate because it stores CA2's certificate. If however the renewed server certificate is issued and signed by a different CA (or at least if CA2's name and/or its private key has changed), device agent 212 will fail to verify the renewed server certificate. In such a case, client 210's certificate store 211 will need to be updated to include the new CA's certificate (or CA2's new certificate) before device agent 212 will be able to again communicate securely with server 220.

The present invention is generally directed to a technique by which device agent 212 (or another web-based application on client 210) can authenticate server 220 even when the renewed server certificate would fail verification because the necessary CA certificate(s) have not yet been added to certificate store 211. In other words, the present invention provides a fallback authentication process that enables device agent 212 to reestablish secure communication with server 220 after server certificate 250 is renewed with a CA that is unknown to client 210.

Figure 3:
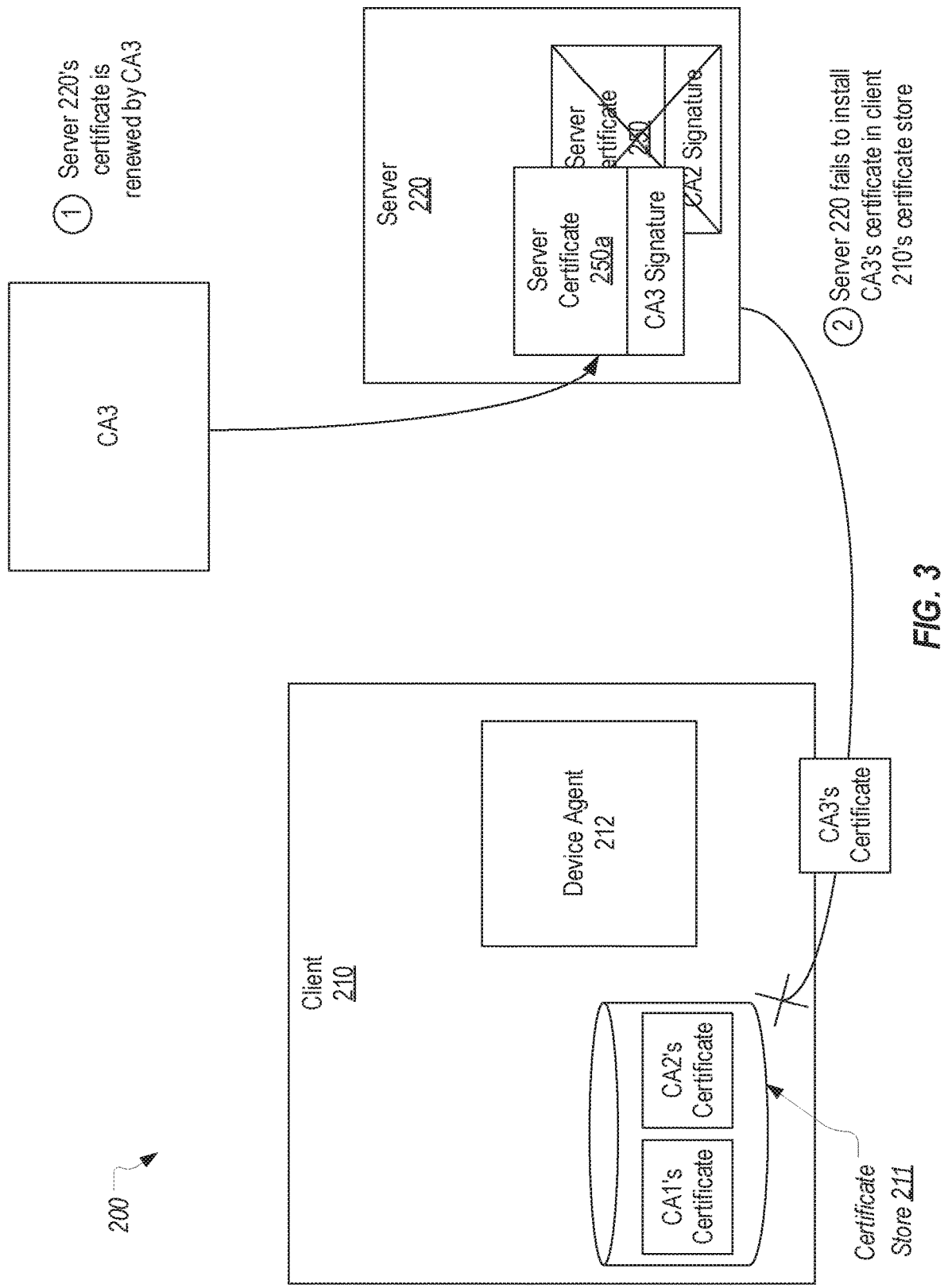
FIG. 3 illustrates how authentication of a server may fail in the client/server environment of FIG. 2 when the server renews its certificate.

FIG. 3 generally depicts a primary scenario that the present invention addresses. As shown, it is assumed that, in step 1, server 220 renews server certificate 250 with CA3 which results in server 220 maintaining renewed server certificate 250a which identifies CA3 as the issuer and which is signed using CA3's private key. It will also be assumed that CA1 issues CA3's certificate such that only CA3's certificate needs to be added to certificate store 211. In step 2, however, server 220 (or another server or device) unsuccessfully attempts to add CA3's certificate to certificate store 211. This failed attempt may oftentimes occur as part of an automatic update that server 220 deploys to all clients 210 that it manages shortly before (e.g., one week before) server 220 commences using renewed server certificate 250a.

FIGS. 4A-4H illustrate functionality that device agent 212 and server 220 can perform to ensure that device agent 212 will retain the ability to securely communicate with server 220 even after the scenario depicted in FIG. 3 occurs—i.e., even after server 220 commences using renewed server certificate 250a that was issued by CA3 and even though CA3's certificate is not stored in certificate store 211. In step 1a shown in FIG. 4A, device agent 212 sends a registration request 401 to server 220. Device agent 212 may send registration request 401 using server 220's URL which is defined in a list of trusted URLs. This list of trusted URLs may typically be pre-programmed into the standard image that is deployed to clients 210, but may also be updated as needed. As represented by the ellipsis in FIG. 4A, the list of trusted URLs may include more than one URL and typically would include the URL of any server with which device agent 212 may communicate (e.g., any URL of a server that provides a service of the cloud-based device management solution).

In response to registration request 401, in step 1b, server 220 sends a server token 402a back to device agent 212. In the context of a cloud-based device management suite, registration request 401 can be part of device agent 212's initial attempt to register to be managed by the device management suite. This would ensure that device agent 212 retrieves server token 402a immediately upon registration. Device agent 212 may also be configured to periodically send registration request 401 so that an updated version of server token 402a will likewise be periodically retrieved.

Server token 402a can include a token identifier that is unique to the requesting client 210. For example, server 220 can include a secure random number generator that it uses to generate a token identifier as a unique 24 digit value for each client 210 that sends a registration request 401. Therefore, although not shown, registration request 401 may specify or otherwise provide an identifier of client 210 which server 220 can use to generate the token identifier to be included in server token 402a and/or to associate server token 402a with the particular client. Additionally, in some embodiments, server 220 can encrypt the token identifier and possibly any other contents of server token 402a using a shared secret that is known to device agent 212 (e.g., a shared secret that is pre-programmed into the standard image). As mentioned above, device agent 212 may be configured to periodically request an updated server token 402a.

Figure 4A:
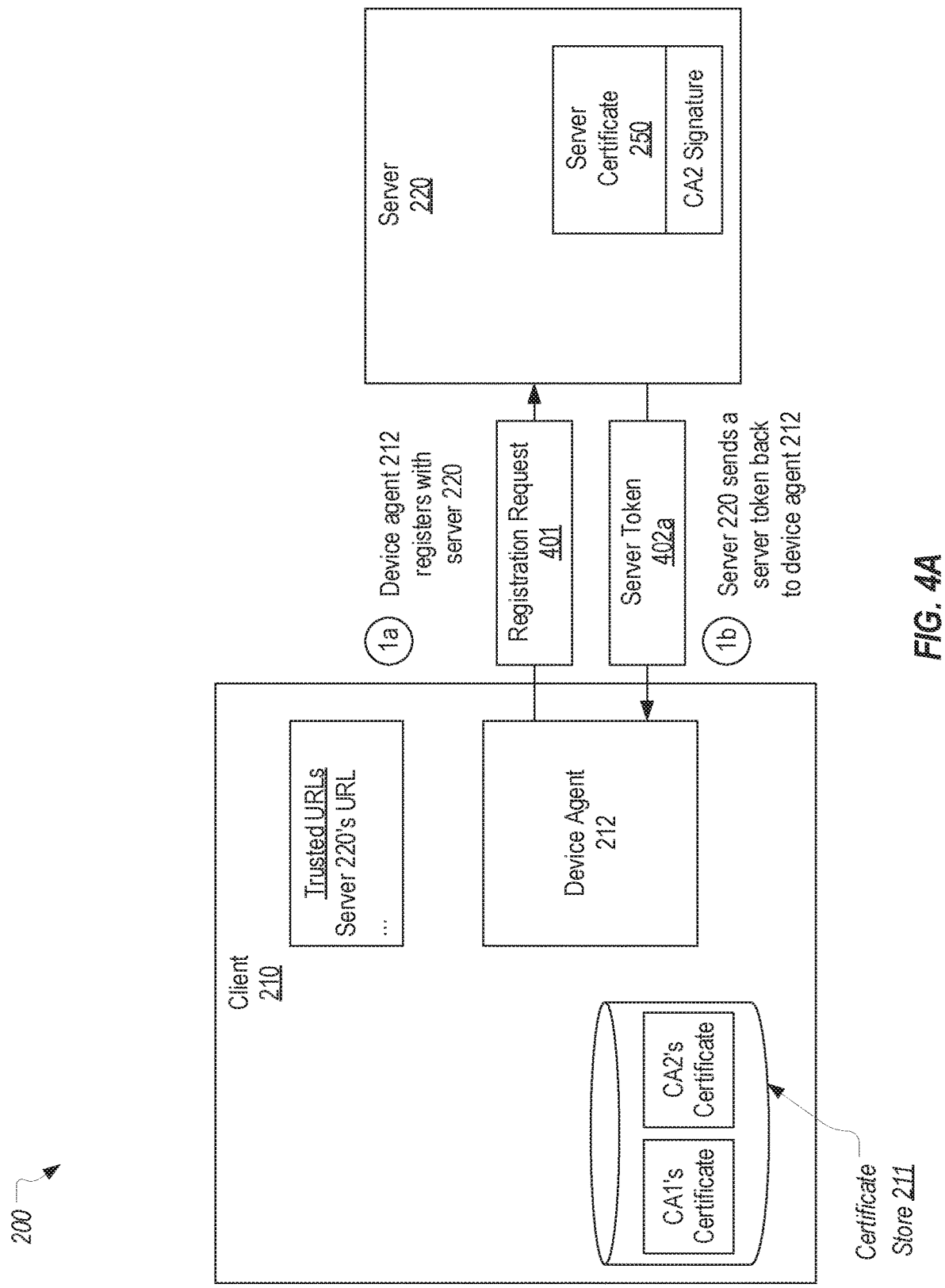
FIGS. 4A-4H illustrate how a web-based application and a server can enable a fallback authentication process to be performed when authentication of the server fails due to the server having renewed its certificate using a CA whose certificate is not stored on the client.
Figure 4B:
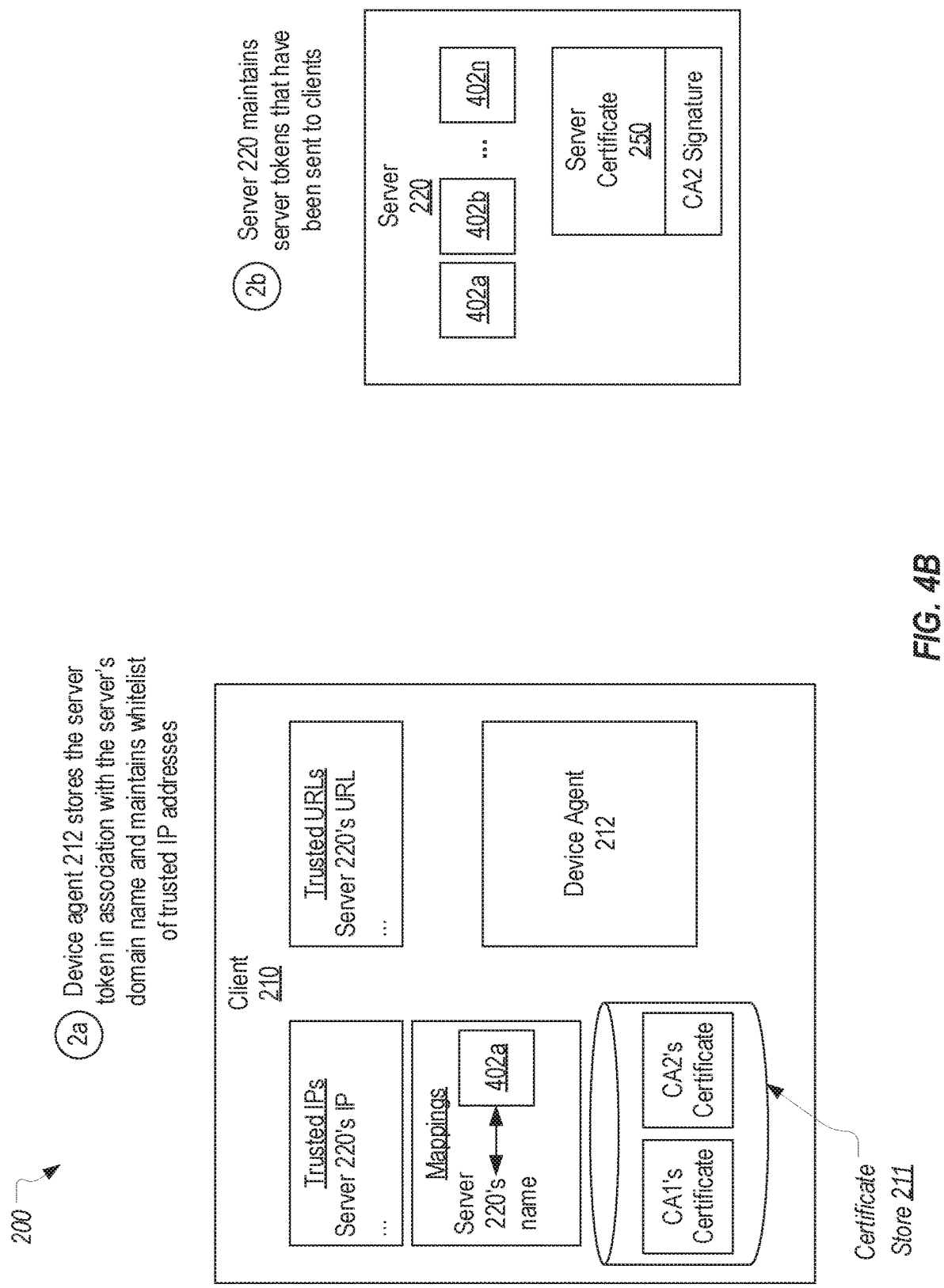

Turning to FIG. 4B, device agent 212 is shown in step 2a as having stored server token 402a and defined a mapping between server token 402a and server 220's domain name. For example, assuming server 220 represents www.dell-.com, device agent 212 can somehow associate www.dell-.com with server token 402a. Likewise, as represented in step 2b, server 220 is shown as having stored server token 402a and many other server tokens 402b-402n which are assumed to correspond with server tokens sent to other clients 210. Although not shown, server 220 can associate the identifier of each client 210 with its corresponding server token. Device agent 212 can be configured to store server token 402a securely to prevent any malicious user or program from obtaining the token identifier defined therein.

FIG. 4B also shows that, as part of step 2a, device agent 212 has added server 220's IP address to a list of trusted IP addresses. Device agent 212 can be configured to add to this list of trusted IP addresses the IP address of any server with which it has completed the SSL authentication process. In other words, if device agent 212 verifies a server's certificate, device agent 212 will add that server's IP address to the list. To simplify the description, device agent 212 is assumed to only communicate with server 220, but in practice, device agent 212 may communicate with a number of servers and may therefore maintain a number of IP addresses in the list as represented by the ellipsis in FIG. 4B.

To keep the list of trusted IP addresses up-to-date, device agent 212 can be configured to periodically archive and then reset the list. In this way, device agent 212 can maintain two lists of trusted IP addresses, the most recently archived list and the current list. Due to this archiving and resetting, only IP addresses of servers with which device agent 212 has recently established secure communication (i.e., trusted servers) will be included in either list.

To summarize, client 210 can be provisioned (or updated) with a list of trusted URLs representing servers with which device agent 212 may communicate securely (e.g., as part of a cloud-based device management suite). As part of establishing secure communication with servers, device agent 212 can also maintain mappings of server tokens to server domain names and a list of trusted IP addresses. As long as device agent 212 continues to verify server 220 (and any other server with which it may attempt to communicate securely), device agent 212 may simply maintain these mappings and lists. In contrast, if device agent 212's attempt to verify server 220 (or another server) fails, device agent 212 can employ these mappings and lists as described below to implement a fallback authentication process.

Figure 4C:
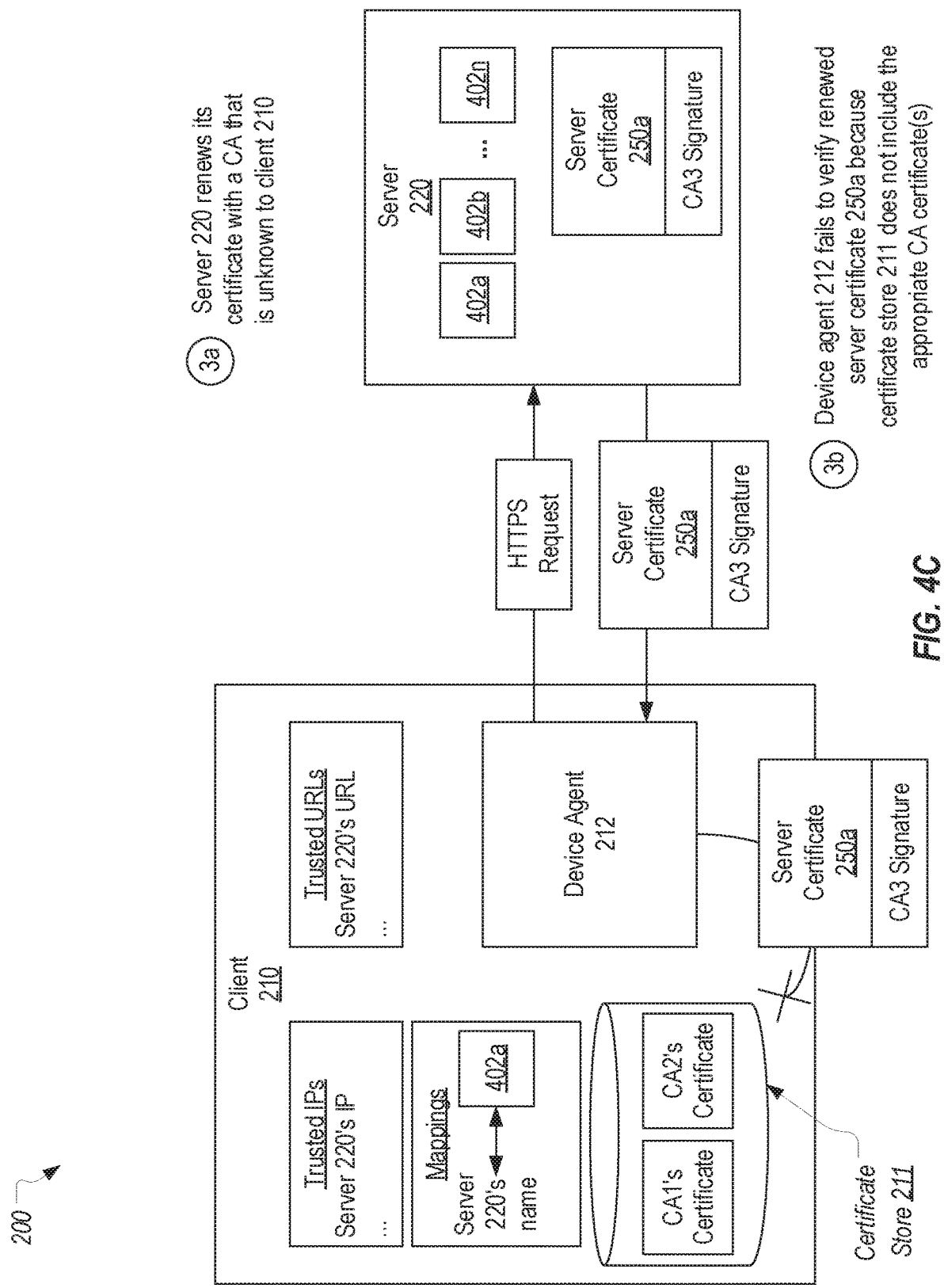

FIG. 4C, which is based on FIG. 3, provides an example where verification of server 220 fails. As represented in step 3, device agent 212 has sent an HTTPS request to server 220 to initiate secure communication. In response, server 220 sends its renewed server certificate 250a. It is assumed that client 210 was not updated to install CA3's certificate in certificate store 211, and therefore, device agent 212 will be unable to verify renewed server certificate 250a. In particular, renewed server certificate 250a will identify CA3 as its issuer and device agent 212 will fail to locate CA3's certificate in certificate store 211 because this certificate has not yet been installed. When this failure occurs, device agent 212 may store a copy of the server certificate so that it can be subsequently used as described below.

Figure 4D:
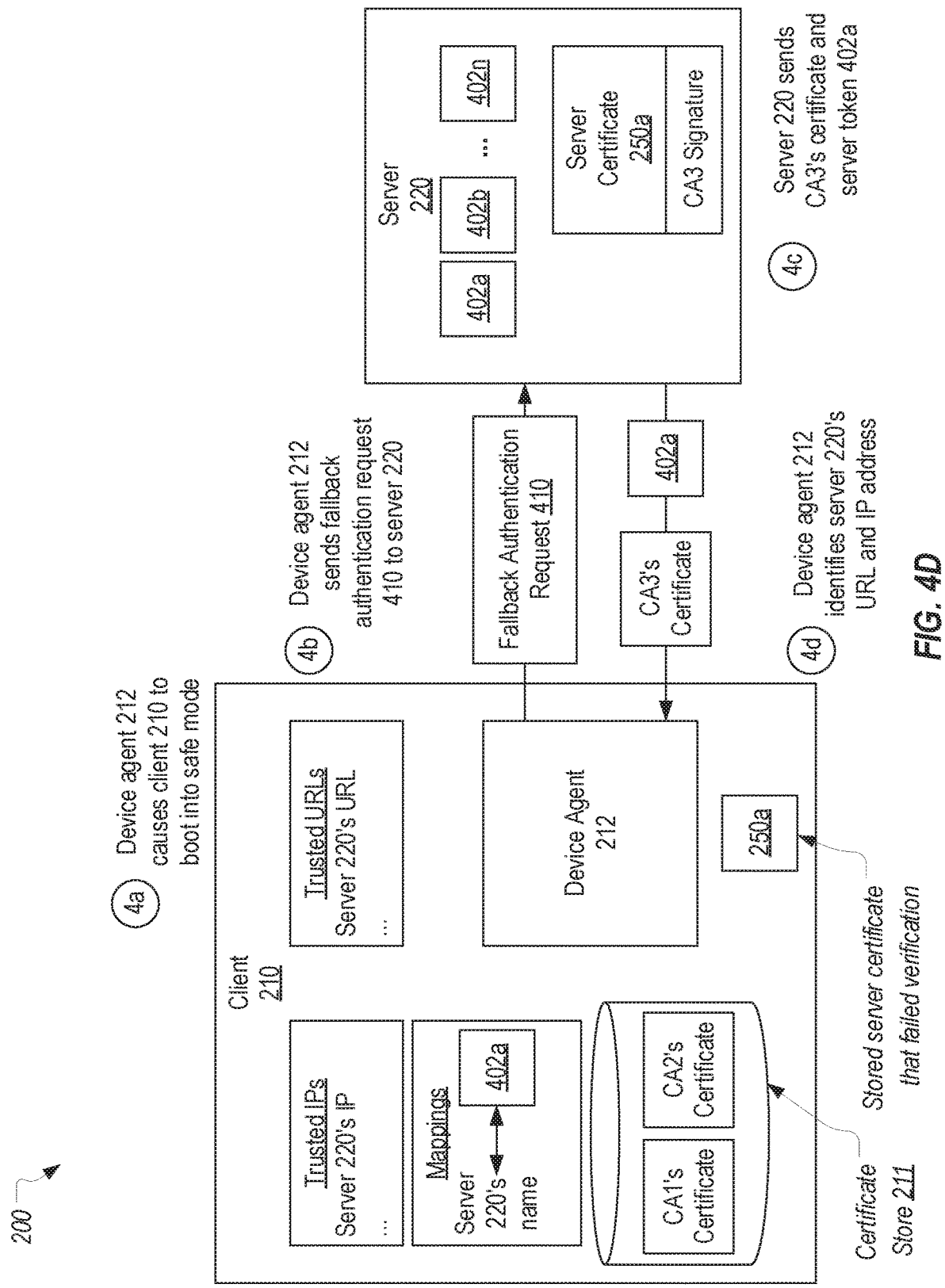

Turning to FIG. 4D, in response to the failure to verify server 220's renewed server certificate 250a, in step 4a, device agent 212 may cause client 210 to reboot into safe mode to thereby minimize the possibility of harm if the failure to verify server 220 is due to something malicious. FIG. 4D also shows that a copy of renewed server certificate 250a has been stored on client 210. In step 4B which may be performed while in safe mode, device agent 212 can send a fallback authentication request 410 to server 220. Server 220 can be configured with an application programming interface (API) that is specifically designed to receive and respond to such requests. In other words, fallback authentication request 410 can represent communications that differ from the typical SSL handshake. Although not shown, device agent 212 can include in fallback authentication request 410 the same identifier of client 210 that was included in registration request 401.

In step 4c, server 220 responds to fallback authentication request 410 by sending server token 402a and any CA certificates that are necessary for authenticating renewed server certificate 250a (e.g., any CA certificates that should have been but were not added to client 210's certificate store 211). In some embodiments, server 220 may also include renewed server certificate 250a in this response which would obviate the need for device agent 212 to store renewed server certificate 250a when the verification fails. Also, in some embodiments, server 220 may not provide the CA certificates directly to device agent 212 but may instead instruct device agent 212 how to retrieve them.

Server 220 can employ the identifier of client 210 specified in or otherwise obtained from fallback authentication request 410 to identify server token 402a from among the various server tokens that server 220 may store. Accordingly, in response to receiving a fallback authentication request, server 220 will send the server token that was previously created for and sent to the client that sent the fallback authentication request. In step 4d, device agent 212 also identifies, from the current connection, server 220's URL and IP address.

Figure 4E:
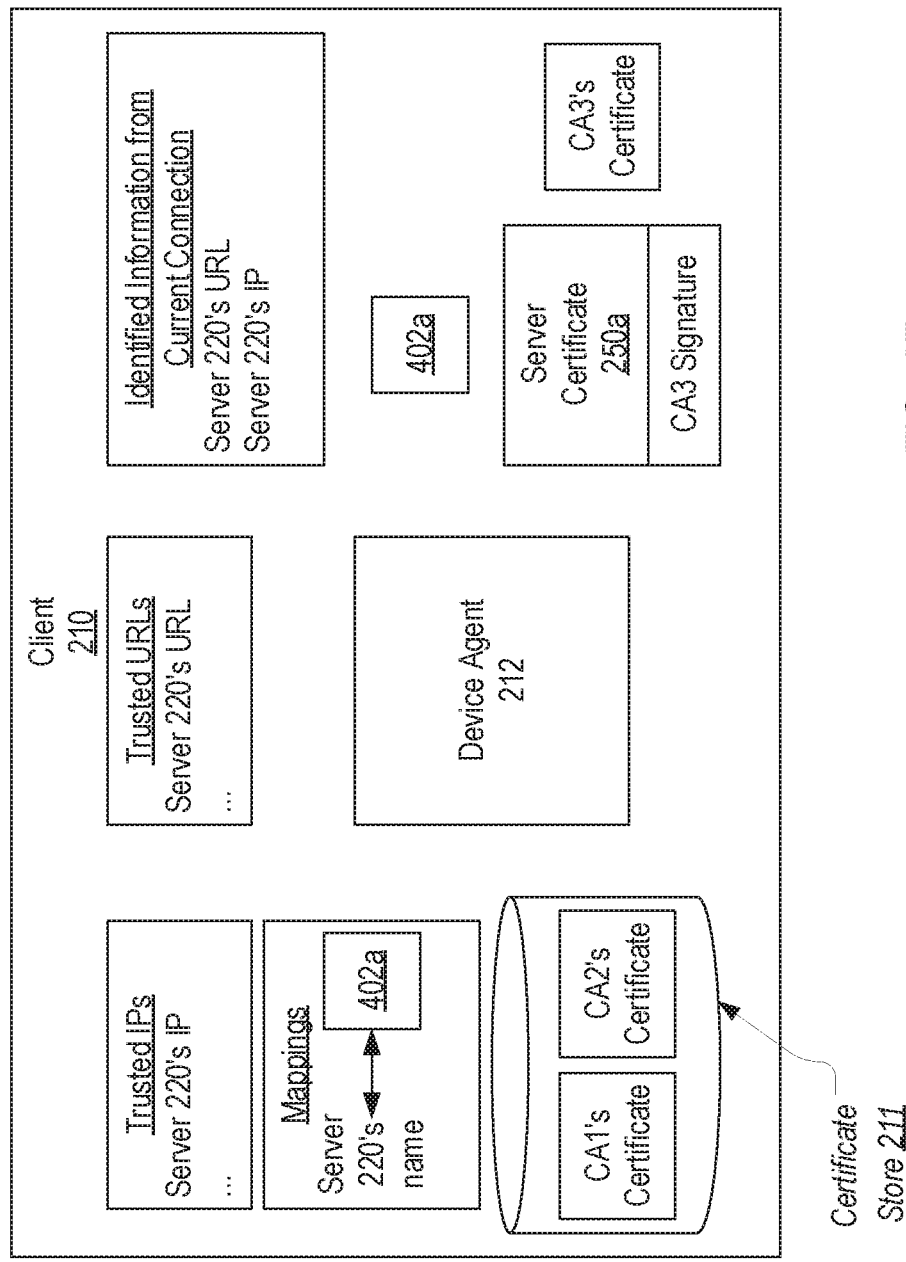

FIG. 4E represents the information and content that client 210 may have obtained after sending fallback authentication request 410 including: (1) the current server's URL and IP address; (2) a server token; (3) a server certificate that client 210 was unable to verify; and (4) any CA certificates that are necessary for verifying the server certificate that failed verification. In this context, the "current server" is intended to represent the server with which device agent 212 is currently communicating (i.e., the server that device agent 212 has failed to authenticate). When the current server is the same, legitimate server with which client 210 had previously registered, the current server's URL and IP address should be included in the list of trusted URLs and the list of trusted IP addresses respectively and the server token received from the current server should match the server token that client 210 had previously stored.

At this point, device agent 212 can perform a fallback authentication process to verify that the server certificate it received but was unable to verify is legitimate. The primary purpose of this fallback authentication process is to determine whether the CA certificate(s) received from the current server (or otherwise obtained) should be added to certificate store 211. In other words, the fallback authentication process enables device agent 212 to securely—and without manual intervention—update certificate store 211 to include any necessary CA certificates so that subsequent attempts to authenticate server 220 using SSL will be successful.

Figure 4F:
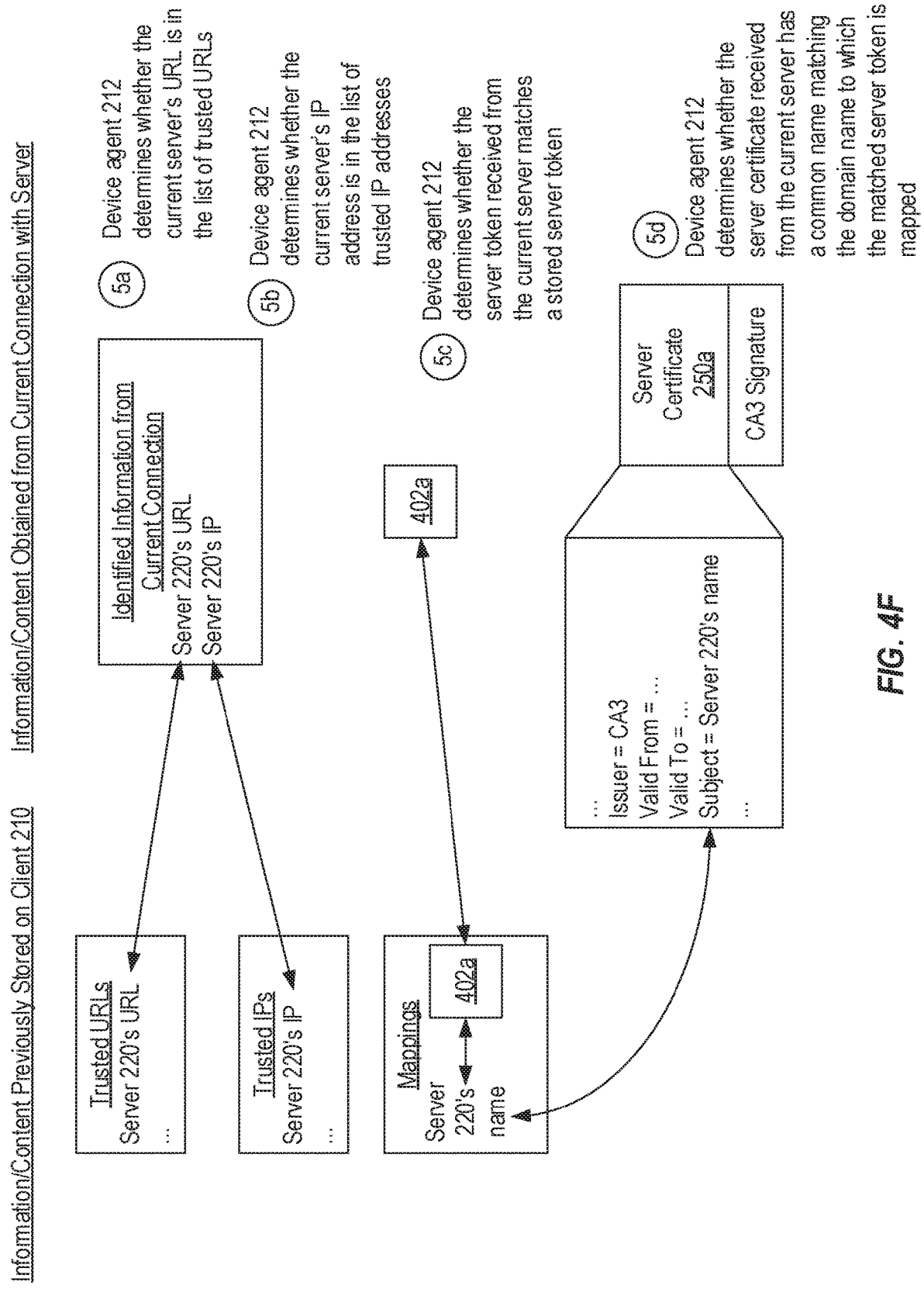

FIG. 4F illustrates how device agent 212 can perform this fallback authentication process. In step 5a, device agent 212 can determine whether the current server's URL is in the list of trusted URLs. This steps ensures that the fallback authentication process will only be available to authenticate servers that are known to client 210 (e.g., only with the servers whose URLs are preprogrammed into client 210's image).

In step 5b, device agent 212 determines whether the current server's IP address is in the list of trusted IP addresses. As described above, this comparison could involve a current list of IP addresses and an archived list of IP addresses. This step ensures that the fallback authentication process will only be available to authenticate a server with which device agent 212 has recently communicated securely and only when the server is still using the same IP address.

In step 5c, device agent 212 compares the server token received from the current server to the server token(s) that device agent 212 had previously stored. A matching server token should only exist on client 210 if the current server is the same server to which device agent 210 sent a registration request 401. For example, the current server should not have (or be able to create) a server token that includes a matching token identifier unless the current server is the same server that sent the server token to device agent 212.

In step 5d, device agent 212 compares the domain name (or common name) defined in the certificate received from the current server to the domain name that is mapped to the matching server token. A match should only exist if the current server is the same server that provided the matching server token.

Applying these steps to the current example, it can be seen that server 220's URL and IP address exist in respective trusted lists, server token 402a received from server 220 will match server token 402a that device agent 212 had previously stored, and renewed server certificate 250a will specify a domain name (Server 220's name) that matches the domain name that device agent 212 had previously mapped to server token 402a. Device agent 212 can therefore determine that the reason why the current server failed authentication is due, not to anything malicious, but to certificate store 211 not including the CA certificate(s) necessary to verify renewed server certificate 250a.

In some embodiments, device agent 212 may implement each of steps 5a-5d when performing the fallback authentication process. However, in other embodiments, device agent 212 may only implement steps 5c and 5d. Also, device agent 212 need not implement steps 5a-5d in the depicted order.

Figure 4G:
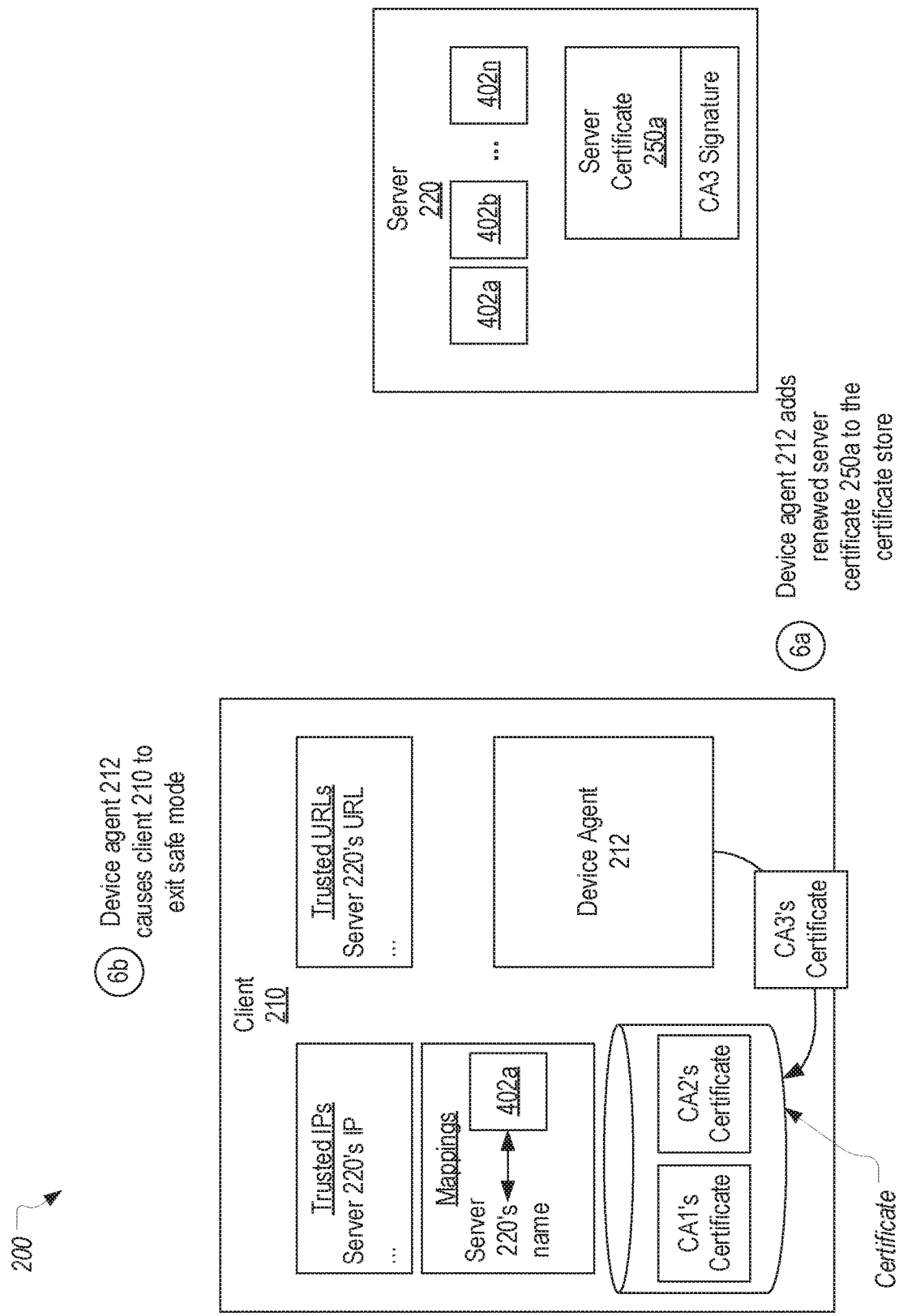
Figure 4H:
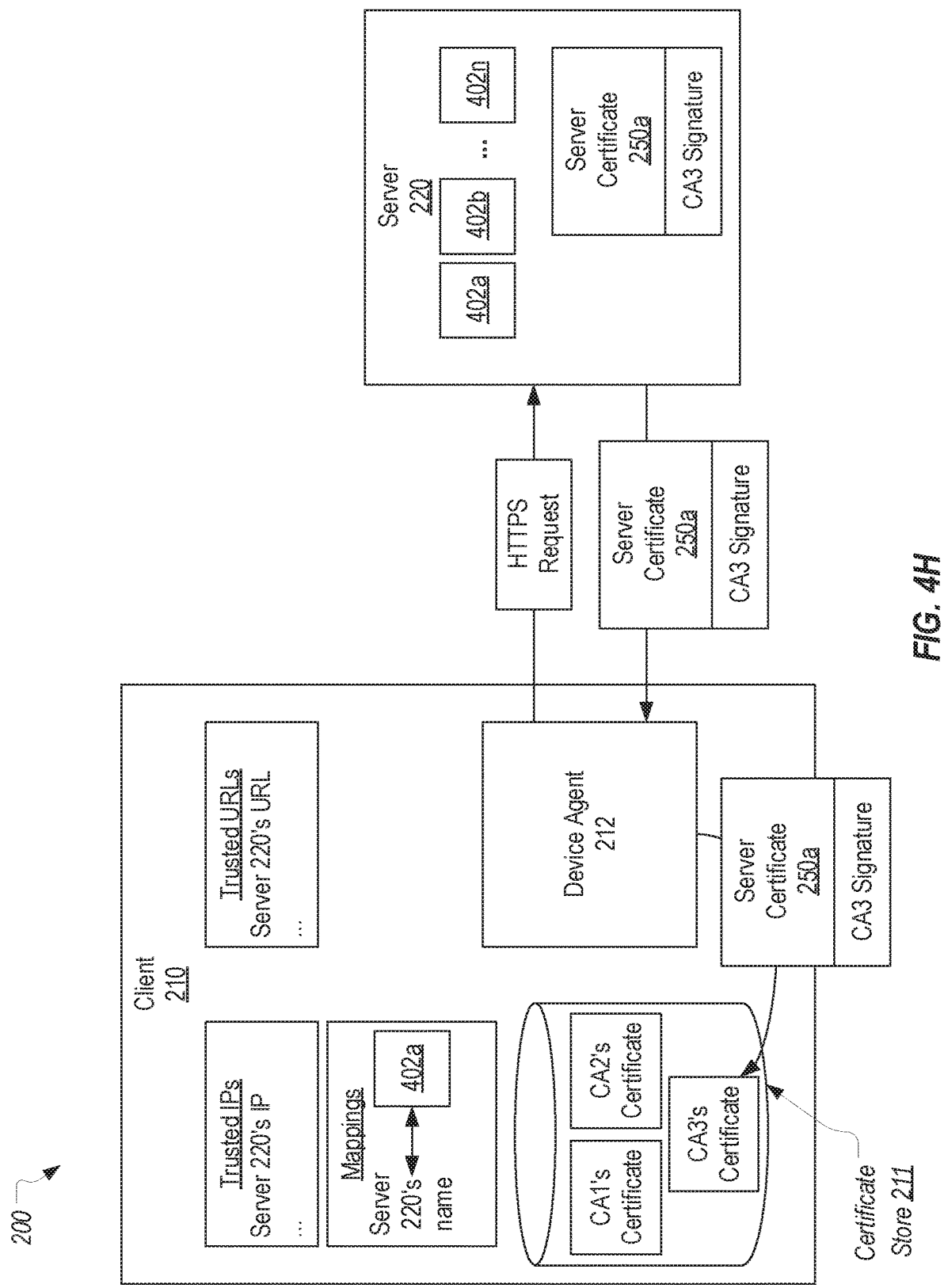

Turning to FIG. 4G, and assuming device agent 212 successfully authenticated server 220 using the fallback authentication process, device agent 212 can then add CA3's certificate to certificate store 211 in step 6a. Accordingly, device agent 212 employs the fallback authentication process to authenticate a server that has failed SSL authentication for the purpose of determining whether any CA certificates provided by the server can safely be added to certificate store 211. In step 6b, device agent 212 can complete the fallback authentication process by causing client 210 to exit safe mode and resume normal operation. For example, FIG. 4H represents that device agent 212's subsequent attempts to establish secure communication with server 220 will be successful because CA3's certificate is now stored in certificate store 211.

To summarize, if server 220 renews its certificate with a CA whose certificate does not exist in certificate store 211, device agent 212 will not be able to authenticate server 220 using SSL unless the CA's certificate is added to the certificate store. Administrators will typically attempt to avoid this scenario by pushing out an update to each client 210 prior to the renewed certificate being used. However, for any client 210 that may not receive the update, the present invention provides a way for device agent 212 (or any other web-based application on client 210) to securely and automatically add any necessary CA certificates to the certificate store. The present invention can therefore minimize or eliminate the need for an administrator to manually install the necessary CA certificates on any clients that missed an update.

Figure 5:
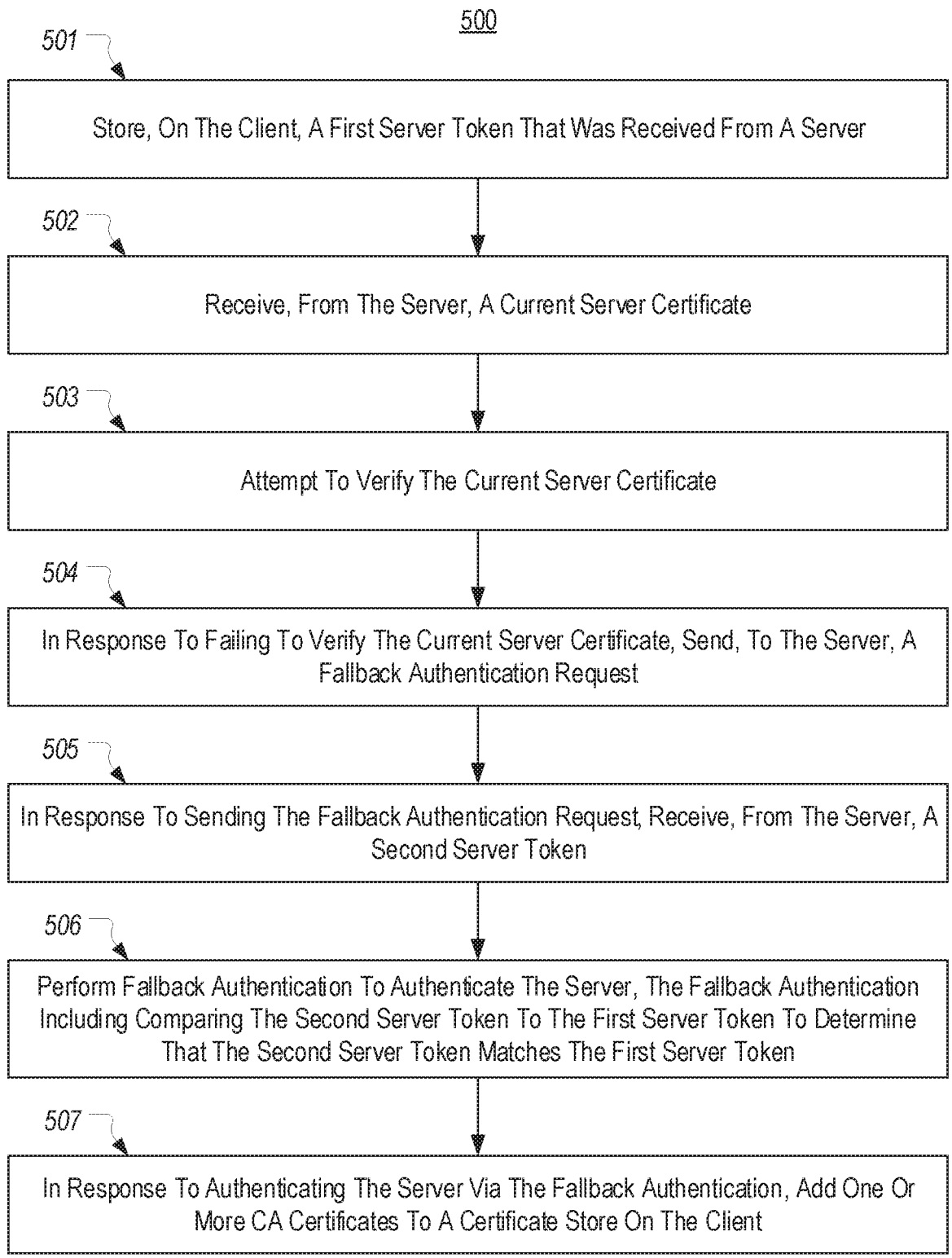
FIG. 5 provides a flowchart of an example method for reestablishing secure communication with a server after verification of the server's certificate failed due to the client not having one or CA certificates that are necessary to verify the server's certificate.

FIG. 5 provides a flow chart of an example method 500 for reestablishing secure communication with a server after verification of the server's certificate failed due to the client not having one or more CA certificates that are necessary to verify the server's certificate. Method 500 can be implemented by device agent 212 or any other web-based application that executes on a client 210.

Method 500 includes an act 501 of storing, on the client, a first server token that was received from a server. For example, device agent 212 can store server token 402a that it received from server 220. Device agent 212 may have received server token 402a as part of an initial registration with server 220, as part of a subsequent request to update the server token or in any other suitable manner.

Method 500 includes an act 502 of receiving, from the server, a current server certificate. For example, device agent 212 can receive renewed server certificate 250a as part of SSL when it attempts to communicate with server 220.

Method 500 includes an act 503 of attempting to verify the current server certificate. For example, device agent 212 can attempt to verify renewed server certificate 250a by accessing certificate store 211 to attempt to locate CA3's certificate.

Method 500 includes an act 504 of, in response to failing to verify the current server certificate, sending, to the server, a fallback authentication request. For example, device agent 212 can send fallback authentication request 410 to server 220. Device agent 212 may send fallback authentication request 410 after causing client 210 to boot into safe mode.

Method 500 includes an act 505 of, in response to sending the fallback authentication request, receiving, from the server, a second server token. For example, device agent 212 can receive server token 402a which server 220 had previously stored.

Method 500 includes an act 506 of performing fallback authentication to authenticate the server, the fallback authentication including comparing the second server token to the first server token to determine that the second server token matches the first server token. For example, device agent 212 can compare server token 402a that it received from server 402a in response to fallback authentication request 410 to server token 402a that it had previously stored.

Method 500 includes an act 507 of, in response to authenticating the server via the fallback authentication, adding one or more CA certificates to a certificate store on the client. For example, device agent 212 can add CA3's certificate to certificate store 211.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media is categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method, implemented on a client, for reestablishing secure communication with a server after verification of the server's certificate failed due to the client not having one or more certificate authority (CA) certificates that are necessary to verify the server's certificate, the method comprising:
   storing, on the client, a first server token that was received from the server;
   receiving, from the server, a current server certificate;
   attempting to verify the current server certificate;
   in response to failing to verify the current server certificate, sending, to the server, a fallback authentication request;
   in response to sending the fallback authentication request, receiving, from the server, a second server token and one or more CA certificates;
   performing fallback authentication to authenticate the server, the fallback authentication including comparing the second server token to the first server token to determine that the second server token matches the first server token; and
   in response to authenticating the server via the fallback authentication, adding the one or more CA certificates to a certificate store on the client.

2. The method of claim 1, wherein comparing the second server token to the first server token includes comparing a second token identifier contained in the second server token to a first token identifier contained in the first server token, wherein the second server token is determined to match the first server token when the second token identifier matches the first token identifier.

3. The method of claim 2, wherein the first server token stored on the client is mapped to a domain name, and wherein performing the fallback authentication further includes determining that a domain name included in the current server certificate matches the domain name to which the first server token is mapped.

4. The method of claim 1, wherein performing the fallback authentication further includes:
identifying a URL of the server; and
comparing the URL of the server to a list of trusted URLs to determine that the URL of the server is included in the list of trusted URLs.

5. The method of claim 1, wherein performing the fallback authentication further includes:
identifying an IP address of the server; and
comparing the IP address of the server to a list of trusted IP addresses to determine that the IP address of the server is included in the list of trusted IP addresses.

6. The method of claim 5, wherein the list of trusted IP addresses only includes IP addresses of servers with which the client has previously established secure communication.

7. The method of claim 1, further comprising:
after the one or more CA certificates are added to the certificate store on the client, again receiving, from the server, the current server certificate;
again attempting to verify the current server certificate;
based on the one or more CA certificates having been added to the certificate store, verifying the current server certificate; and
communicating securely with the server.

8. The method of claim 1, further comprising:
prior to sending the fallback authentication request, causing the client to reboot into safe mode such that the fallback authentication is performed while the client is in safe mode.

9. The method of claim 1, wherein the first server token is received from the server and stored on the client in response to and after verifying a previous server certificate.

10. The method of claim 1, wherein the method is performed by a device agent that executes on the client and the server is part of a device management suite.

11. One or more non-transitory computer storage media storing computer executable instructions which when executed on a client implement a method for reestablishing secure communication with a server after verification of the server's certificate failed due to the client not having one or more certificate authority (CA) certificates that are necessary to verify the server's certificate, the method comprising:
storing, on the client, a first server token that was received from the server;
receiving, from the server, a current server certificate;
attempting to verify the current server certificate;
in response to failing to verify the current server certificate, sending, to the server, a fallback authentication request;
in response to sending the fallback authentication request, receiving, from the server, a second server token and one or more CA certificates;
performing fallback authentication to authenticate the server, the fallback authentication including comparing the second server token to the first server token to determine that the second server token matches the first server token; and in response to authenticating the server via the fallback authentication, adding the one or more CA certificates to a certificate store on the client.

12. The computer storage media of claim 11, wherein comparing the second server token to the first server token includes comparing a second token identifier contained in the second server token to a first token identifier contained in the first server token, wherein the second server token is determined to match the first server token when the second token identifier matches the first token identifier.

13. The computer storage media of claim 12, wherein the first server token stored on the client is mapped to a domain name, and wherein performing the fallback authentication further includes determining that a domain name included in the current server certificate matches the domain name to which the first server token is mapped.

14. The computer storage media of claim 11, wherein performing the fallback authentication further includes:
identifying a URL of the server; and
comparing the URL of the server to a list of trusted URLs to determine that the URL of the server is included in the list of trusted URLs.

15. The computer storage media of claim 11, wherein performing the fallback authentication further includes:
identifying an IP address of the server; and
comparing the IP address of the server to a list of trusted IP addresses to determine that the IP address of the server is included in the list of trusted IP addresses.

16. The computer storage media of claim 15, wherein the list of trusted IP addresses only includes IP addresses of servers with which the client has previously established secure communication.

17. The computer storage media of claim 11, further comprising:
after the one or more CA certificates are added to the certificate store on the client, again receiving, from the server, the current server certificate;
again attempting to verify the current server certificate;
based on the one or more CA certificates having been added to the certificate store, verifying the current server certificate; and
communicating securely with the server.

18. The computer storage media of claim 11, further comprising:
prior to sending the fallback authentication request, causing the client to reboot into safe mode such that the fallback authentication is performed while the client is in safe mode.

19. The computer storage media of claim 11, wherein the first server token is received from the server and stored on the client in response to and after verifying a previous server certificate.

20. A client comprising:
one or more hardware processors; and
computer storage media storing computer executable instructions which when executed by the one or more processors implement a method for reestablishing secure communication with a server after verification of the server's certificate failed due to the client not having one or more certificate authority (CA) certificates that are necessary to verify the server's certificate, the method comprising:
storing, on the client, a first server token that was received from the server;
receiving, from the server, a current server certificate;
attempting to verify the current server certificate;

in response to failing to verify the current server certificate, sending, to the server, a fallback authentication request;

in response to sending the fallback authentication request, receiving, from the server, a second server token and one or more CA certificates;

performing fallback authentication to authenticate the server, the fallback authentication including comparing the second server token to the first server token to determine that the second server token matches the first server token; and in response to authenticating the server via the fallback authentication, adding the one or more CA certificates to a certificate store on the client.

* * * * *